United States Patent
Tanaya

(10) Patent No.: US 8,014,916 B2
(45) Date of Patent: Sep. 6, 2011

(54) INTERNAL-COMBUSTION-ENGINE IGNITION DIAGNOSIS APPARATUS AND INTERNAL-COMBUSTION-ENGINE CONTROL APPARATUS

(75) Inventor: Kimihiko Tanaya, Chiyoda-ku (JP)

(73) Assignee: Mitsubishi Electric Corporation, Tokyo (JP)

(*) Notice: Subject to any disclaimer, the term of this patent is extended or adjusted under 35 U.S.C. 154(b) by 638 days.

(21) Appl. No.: 12/179,178

(22) Filed: Jul. 24, 2008

(65) Prior Publication Data

US 2009/0099722 A1    Apr. 16, 2009

(30) Foreign Application Priority Data

Oct. 11, 2007   (JP) ................................. 2007-265632

(51) Int. Cl.
*G01M 17/00*    (2006.01)

(52) U.S. Cl. ............ 701/29; 701/66; 701/104; 701/105; 123/623

(58) Field of Classification Search ................... 701/29, 701/31, 32, 33, 66, 103, 104, 105, 123; 123/406.21, 123/406.23, 406.26, 406.39, 623; 73/35.08, 114.62

See application file for complete search history.

(56) References Cited

U.S. PATENT DOCUMENTS 5,694,900 A * 12/1997 Morita et al. ............ 123/406.21

FOREIGN PATENT DOCUMENTS

JP          05231293 A      9/1993
JP          3614150 B2     11/2004

* cited by examiner

*Primary Examiner* — Gertrude Arthur Jeanglaud
(74) *Attorney, Agent, or Firm* — Sughrue Mion, PLLC

(57) ABSTRACT

The internal-combustion-engine ignition diagnosis apparatus is configured in such a way that the first duration setting unit sets the first detection duration in a predetermined duration including a time instant when the spark discharge is generated, the second duration setting unit sets the second detection duration after the first detection duration, the diagnosis unit determines normality of the spark discharge, based on a signal state in the second detection duration, and regardless of the signal state in the second detection duration, determines abnormality of the spark discharge, based on a signal state in the first detection duration.

7 Claims, 6 Drawing Sheets

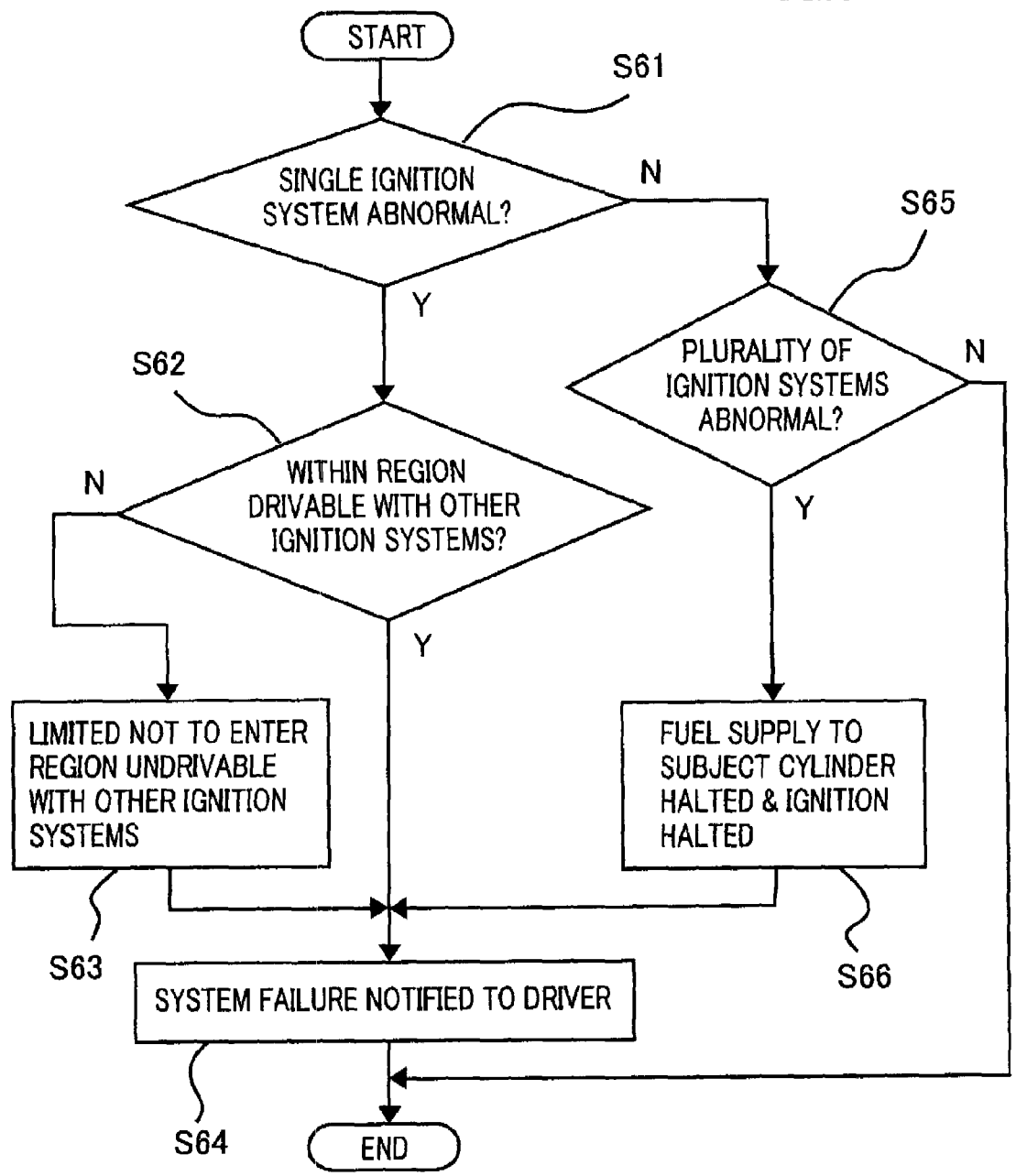

INTERNAL-COMBUSTION-ENGINE IGNITION DIAGNOSIS APPARATUS AND INTERNAL-COMBUSTION-ENGINE CONTROL APPARATUS

BACKGROUND OF THE INVENTION

1. Field of the Invention

The present invention relates to an internal-combustion-engine ignition diagnosis apparatus that diagnoses the condition of a spark discharge generated by an ignition device and to an internal-combustion-engine control apparatus provided with the ignition diagnosis apparatus.

2. Description of the Related Art

In recent years, problems of environmental conservation and fuel depletion have been raised, and also in the automobile industry, solutions to these problems have become big issues.

As solutions to the foregoing problems, many technologies that intend to raise the efficiency of an engine as much as possible have been developed; some of them utilize an exhaust gas recirculation method (referred to as "EGR", hereinafter) in order to reduce an intake loss.

In the EGR method, an exhaust gas, which is a burned material, is introduced again into a combustion chamber; in particular, because, in the case where a great deal of exhaust gas is utilized, nonflammable burned materials much affect the combustion, the combustion temperature decreases and the combustion flame does not readily spread, whereby combustibility is deteriorated; therefore, an internal combustion engine utilizing a so-called multi-point ignition system, which ensures combustibility by utilizing a plurality of ignition plugs in the same combustion chamber of an internal combustion engine, has been proposed and realized.

However, in the case of a multi-point ignition system, because, even when part of the ignition systems fail, combustion can be continued in many cases, no malfunction of this kind can be detected by an existing misfire detection system. Accordingly, because required ignition energy cannot be obtained, deterioration in an exhaust gas (an emission) due to deterioration in the combustion condition and deterioration in the gasoline mileage due to output decrease are caused, whereby a disadvantage occurs, despite the realization of environmental conservation.

In addition, as an apparatus that performs a failure diagnosis on an ignition coil, an apparatus is disclosed in which a primary current flowing through the primary coil of an ignition coil is detected and a failure diagnosis is performed based on whether or not the primary current flows (e.g., refer to Japanese Patent No. 3614150)

The conventional apparatus disclosed in Japanese Patent No. 3614150 is nothing but an apparatus in which an input signal for activating the ignition coil is inputted, and based on the input signal, it is ascertained whether or not the operation of the primary coil of the ignition coil has been performed; thus, it is not required to ascertain whether or not a spark has eventually been discharged. For example, in a failure mode such as a short circuit across the secondary coil of the ignition coil or a short circuit between the electrodes of an ignition plug, no-spark operation cannot be detected; therefore, it has been a problem that deterioration in the gasoline mileage and deterioration in the emission caused in the foregoing failure mode cannot be recognized.

SUMMARY OF THE INVENTION

The present invention has been implemented in order to solve the foregoing problems in the conventional apparatuses; the objective of the present invention is to provide an internal-combustion-engine ignition diagnosis apparatus that can accurately diagnose the condition of a spark discharge.

Moreover, the objective of the present invention is to provide an internal-combustion-engine control apparatus that is provided with an ignition diagnosis apparatus capable of accurately diagnosing the condition of a spark discharge and that can control an internal combustion engine, based on the diagnosed condition of a spark discharge.

An internal-combustion-engine ignition diagnosis apparatus according to the present invention is provided in an internal combustion engine having an ignition device that performs operation of generating a spark discharge for igniting a fuel supplied into a combustion chamber of the internal combustion engine and a high voltage device that generates a high voltage for generating the spark discharge and applies the high voltage to the ignition device, and diagnoses a condition of the spark discharge generated by the ignition device; the internal-combustion-engine ignition diagnosis apparatus is characterized by including a biasing device that generates a biasing voltage whose polarity is opposite to that of the high voltage and applies the biasing voltage to the ignition device; a signal extraction device that extracts a signal generated due to application of the biasing voltage; a first duration setting unit that sets a first detection duration in which the extracted signal is processed; a second duration setting unit that sets a second detection duration in which the extracted signal is processed; and a diagnosis unit that diagnoses a condition of the spark discharge, based on the signal in the first detection duration and the second detection duration, and further characterized in that the first duration setting unit sets the first detection duration in a predetermined duration including a time instant when the spark discharge is generated, in that the second duration setting unit sets the second detection duration after the first detection duration, and in that the diagnosis unit determines normality of the spark discharge, based on a signal state in the second detection duration, and regardless of the signal state in the second detection duration, determines abnormality of the spark discharge, based on a signal state in the first detection duration.

Moreover, an internal-combustion-engine control apparatus according to the present invention is characterized by including a plurality of ignition devices that are provided in a same combustion chamber and each perform operation of generating a spark discharge for igniting a fuel supplied into the combustion chamber; a plurality of high voltage devices that generate high voltages for making the plurality of ignition devices generate spark discharges and apply the high voltages to the plurality of ignition devices; a plurality of biasing devices that generate biasing voltages whose polarities are opposite to those of the high voltages and apply the biasing voltages to the plurality of ignition devices; a control unit that controls the operations of the plurality of ignition devices; and an ignition diagnosis apparatus that diagnoses states of the spark discharges generated by all of the plurality of ignition devices, and further characterized in that the ignition diagnosis apparatus includes a signal extraction device that extracts a signal generated due to application of the biasing voltage; a first duration setting unit that sets a first detection duration in which the extracted signal is processed; a second duration setting unit that sets a second detection duration in which the extracted signal is processed; and a diagnosis unit that diagnoses a condition of the spark discharge, based on the signal in the first detection duration and the second detection duration, in that the first duration setting unit sets the first detection duration in a predetermined duration including a time instant when the spark discharge is generated, in that the second duration setting unit sets the second detection duration after the first detection duration, and in that the diagnosis unit determines normality of the spark discharge, based on a signal state in the second detection duration, and regardless of the signal state in the second detection duration, determines abnormality of the spark discharge, based on a signal state in the first detection duration.

An internal-combustion-engine ignition diagnosis apparatus according to the present invention is configured in such a way as to include a biasing device that generates a biasing voltage whose polarity is opposite to that of a high voltage generated by a high voltage device and applies the biasing voltage to an ignition device; a signal extraction device that extracts a signal generated due to application of the biasing voltage; a first duration setting unit that sets a first detection duration in which the extracted signal is processed; a second duration setting unit that sets a second detection duration in which the extracted signal is processed; and a diagnosis unit that diagnoses a condition of a spark discharge, based on the signal in the first detection duration and the second detection duration, and further configured in such a way that the first duration setting unit sets the first detection duration in a predetermined duration including a time instant when the spark discharge is generated, in such a way that the second duration setting unit sets the second detection duration after the first detection duration, and in such a way that the diagnosis unit determines normality of the spark discharge, based on a signal state in the second detection duration, and regardless of the signal state in the second detection duration, based on a signal state in the first detection duration; therefore, the state of a spark discharge can securely be diagnosed, whereby a failure in the internal combustion engine is recognized. As a result, even in the case where, due to the failure, the gasoline mileage decreases or the emission performance is deteriorated, a driver is urged to repair the portion in failure so that a rapid repair can be performed; thus, the internal-combustion-engine ignition diagnosis apparatus can contribute to environmental conservation.

Moreover, an internal-combustion-engine control apparatus according to the present invention is configured in such a way as to include a plurality of ignition devices that are provided in a same combustion chamber and each perform operation of generating a spark discharge for igniting a fuel supplied into the combustion chamber; a plurality of high voltage devices that generate high voltages for making the plurality of ignition devices generate spark discharges and apply the high voltages to the plurality of ignition devices; a plurality of biasing devices that generate biasing voltages whose polarities are opposite to those of the high voltages and apply the biasing voltages to the plurality of ignition devices; a control unit that controls the operations of the plurality of ignition devices; and an ignition diagnosis apparatus that diagnoses states of the spark discharges generated by all of the plurality of ignition devices, and further configured in such a way that the ignition diagnosis apparatus is provided with a signal extraction device that extracts a signal generated due to application of the biasing voltage; a first duration setting unit that sets a first detection duration in which the extracted signal is processed; a second duration setting unit that sets a second detection duration in which the extracted signal is processed; and a diagnosis unit that diagnoses a condition of the spark discharge, based on the signal in the first detection duration and the second detection duration, in such a way that the first duration setting unit sets the first detection duration in a predetermined duration including a time instant when the spark discharge is generated, in such a way that the second duration setting unit sets the second detection duration after the first detection duration, and in such a way that the diagnosis unit determines normality of the spark discharge, based on a signal state in the second detection duration, and regardless of the signal state in the second detection duration, determines abnormality of the spark discharge, based on a signal state in the first detection duration; therefore, because, in a multi-point ignition system, a diagnosis on a spark discharge by each ignition system can be performed, a failure in the system can appropriately be recognized, even in the case where part of the plurality of ignition systems provided in the same combustion chamber fail. As a result, even in the case where, due to a failure, the gasoline mileage decreases or the emission performance is deteriorated, a driver is urged to repair the portion in failure so that a rapid repair can be performed; thus, the internal-combustion-engine control apparatus can contribute to environmental conservation.

The foregoing and other object, features, aspects, and advantages of the present invention will become more apparent from the following detailed description of the present invention when taken in conjunction with the accompanying drawings.

BRIEF DESCRIPTION OF THE DRAWINGS

FIG. 6 is a flowchart for explaining the operation of the internal-combustion-engine control apparatus according to Embodiment 2 of the present invention.

DETAILED DESCRIPTION OF THE PREFERRED EMBODIMENTS

Embodiment 1

Figure 1:
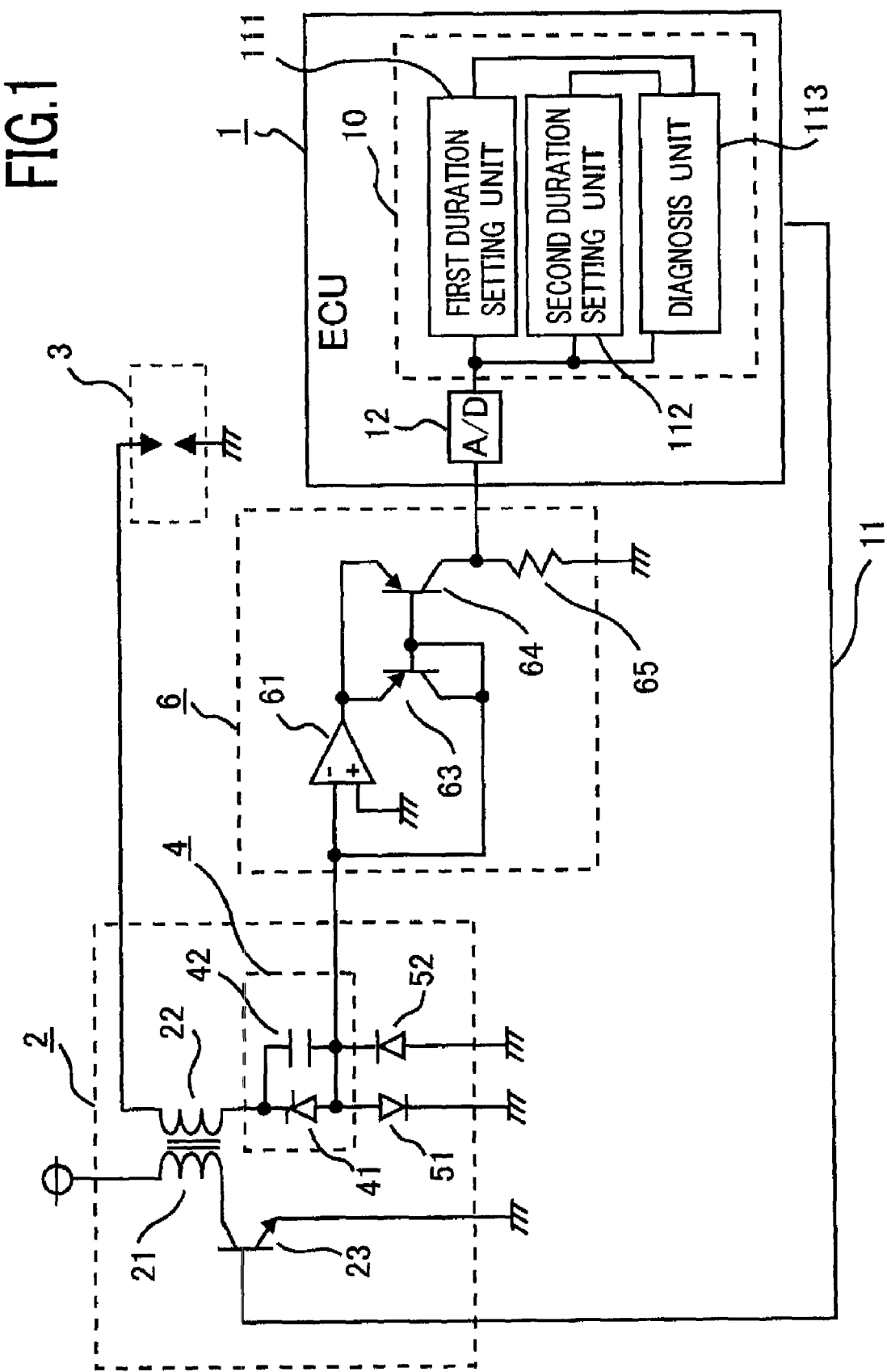
FIG. 1 is a block diagram illustrating the configuration of an internal-combustion-engine ignition diagnosis apparatus according to Embodiment 1 of the present invention.
Figure 2:
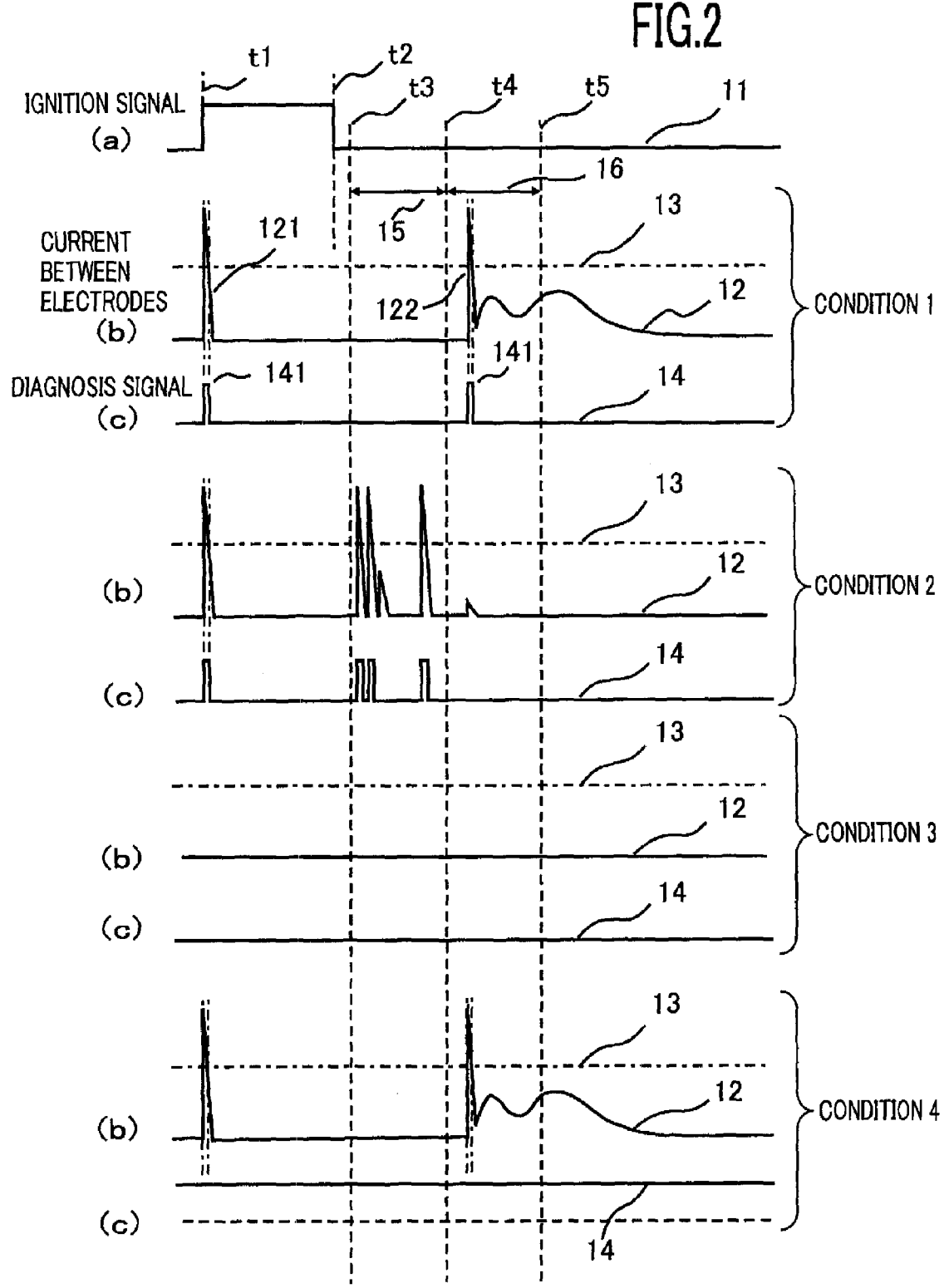
FIG. 2 is a timing chart for explaining the operation of the internal-combustion-engine ignition diagnosis apparatus according to Embodiment 1 of the present invention.
Figure 3:
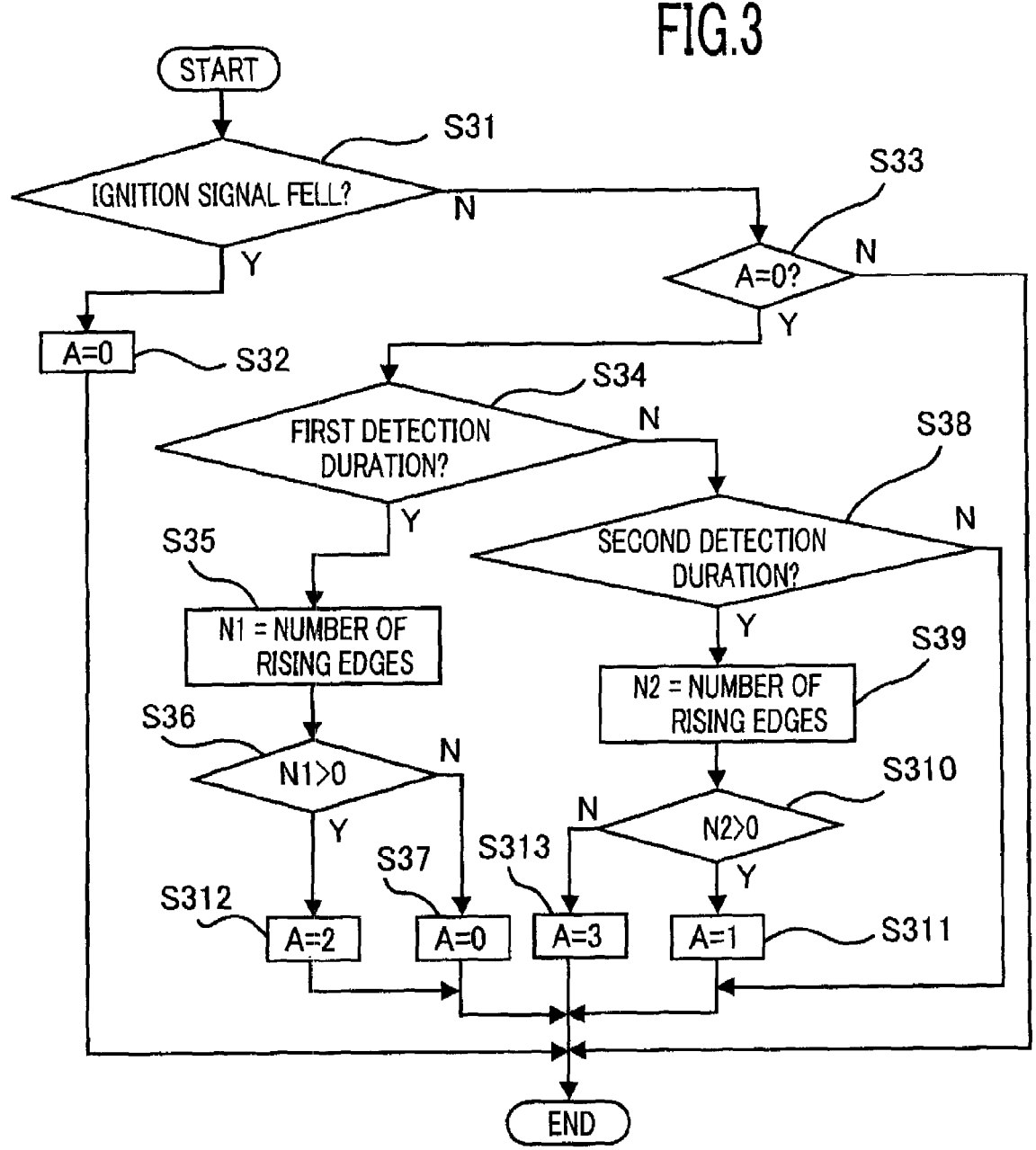
FIG. 3 is a flowchart for explaining the operation of the internal-combustion-engine ignition diagnosis apparatus according to Embodiment 1 of the present invention.
Figure 4:
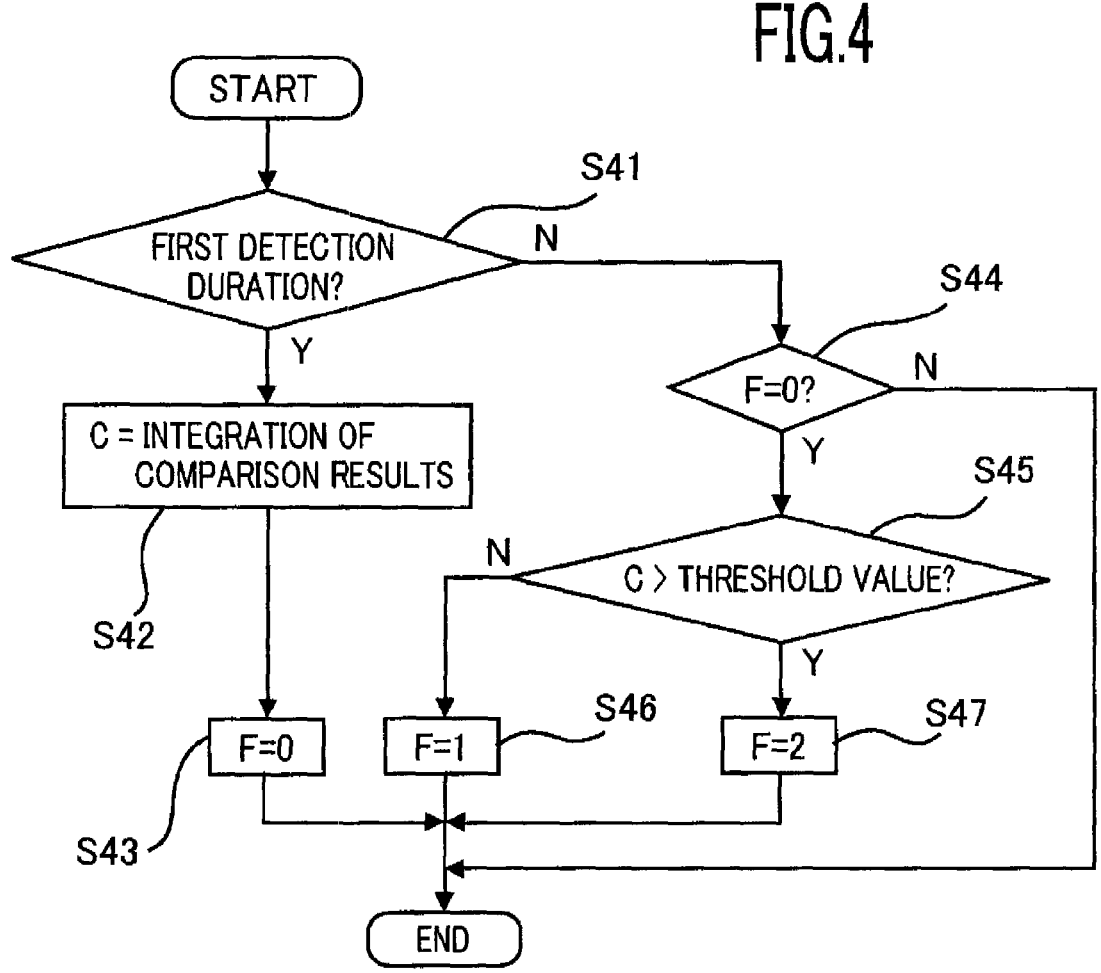
FIG. 4 is a flowchart for explaining wire-breakage detection operation of the internal-combustion-engine ignition diagnosis apparatus according to Embodiment 1 of the present invention.

An internal-combustion-engine ignition diagnosis apparatus according to Embodiment 1 of the present invention will be explained below. FIG. 1 is a block diagram illustrating an internal-combustion-engine ignition diagnosis apparatus according to Embodiment 1 of the present invention; FIG. 2 is a timing chart for explaining the operation of internal-combustion-engine ignition diagnosis apparatus; FIGS. 3 and 4 are flowcharts for explaining the operation of internal-combustion-engine ignition diagnosis apparatus.

In FIG. 1, an engine control unit (referred to as "ECU", hereinafter) 1 that controls an internal combustion engine (unillustrated) generates an ignition signal 11 for activating an ignition coil 2 as a high voltage device and inputs the ignition signal to the base of a switching element 23 connected in series to a primary coil 21 of the ignition coil 2. A secondary coil 22 of the ignition coil 2 is coupled with the primary coil 21 through a magnetic core; one terminal thereof is connected to one of electrodes of an ignition plug 3 as an ignition device. The ECU 1 serves also as a control unit for controlling the spark-discharge operation of the ignition plug 3.

The other electrode of the ignition plug 3 is earthed. The ignition plug 3 is provided in the combustion chamber of the internal combustion engine, generates a spark discharge between the electrodes that face each other and are spaced apart from each other by a predetermined gap, and sets fire to a fuel supplied into the combustion chamber so as to burn it.

A biasing device 4 is configured with a zener diode 41 whose cathode is connected to the other terminal of the secondary coil 22 of the ignition coil 2 and with a capacitor 42 connected in parallel with the zener diode 41. The biasing device 4 is earthed through a pair of diodes 51 and 52 that are connected with each other in an antiparallel manner.

A signal extraction device 6 is configured with a differential amplifier 61 one terminal of which is connected to the capacitor 42 in the biasing device 4, a pair of transistors 63 and 64 that are connected to the output terminal of the differential amplifier 61, and a resistor 65 one terminal of which is connected to the collector of the transistor 64 and the other terminal of which is earthed. Because the signal extraction device 6, as described later, compares a current signal that flows across the electrodes of the ignition plug 3 with a predetermined comparison level and outputs a diagnosis signal based on the result of the comparison, it may be referred to also as a comparison device; however, it is referred to as a signal extraction device, hereinafter.

A first duration setting unit 111, a second duration setting unit 112, and a diagnosis unit 113 are provided in a microprocessor 10 in the ECU 1 and connected to the output terminal of the signal extraction device 6 through an A/D conversion circuit 12. The functions of the first duration setting unit 111, the second duration setting unit 112, and the diagnosis unit 113 will be described later.

FIG. 2 is a combination of a chart representing a waveform (a) of the ignition signal 11 generated by the ECU 1 and charts for conditions 1, 2, 3, and 4 in each of which a waveform (b) of a current signal 12 and a waveform (c) of a diagnosis signal 14 based on the result of a comparison between the current signal 12 and a predetermined comparison level 13 are represented.

Here, the condition 1 represents a case in which a normal spark discharge is produced, a normal combustion is performed, and this fact is normally transmitted to the microprocessor 10 in the ECU 1; the condition 2 represents a case in which, although a high voltage between the electrodes of the ignition plug 3 is generated, a spark discharge fails, and this fact is normally transmitted to the microprocessor 10 in the ECU 1; the condition 3 represents a case in which a high voltage between the electrodes of the ignition plug 3 cannot be generated and a spark discharge fails, and this fact is normally transmitted to the microprocessor 10 in the ECU 1; the condition 4 represents a case in which, although a normal spark discharge between the electrodes of the ignition plug 3 is produced and a normal combustion is performed, the diagnosis signal 14 is not normally transmitted from the signal extraction device 6 to the ECU 1, due to breakage of the path through which a diagnosis result is transmitted.

In FIGS. 1 and 2, in the case where, in the condition 1 in which spark discharge operation by the ignition plug 3 is normal, the level of the ignition signal 11 from the ECU 1 changes from high to low at the time instant t1, the switching element 23 turns on, and the primary current that flows through the primary coil 21 of the ignition coil 2 gradually rises due to a self-induction effect. Because, at this time instant t1, the change ratio of the primary current is small, the secondary voltage induced across the secondary coil 22 is small, whereby the ignition plug 3 does not produce a spark discharge; however, as represented as (b) in the condition 1 in FIG. 2, a charging current for the capacitor 42 instantaneously flows across the electrodes of the ignition plug 3.

A current signal 121 based on the charging current is applied to the signal extraction device 6; during a duration in which the current signal 121 is above a comparison level 13 set for the differential amplifier 61 in the signal extraction device 6, the diagnosis signal 14 outputted from the signal extraction device 6 becomes a high level 141, as represented as (c) in the condition 1 in FIG. 2, and is inputted to the A/D conversion circuit 12 in the ECU 1 so as to be converted into a digital signal.

Next, at the time instant t2 which is an ignition timing, the level of the ignition signal 11 form the ECU 1 changes from high to low, and the switching element 23 turns off. As a result, the current flowing through the primary coil 21 of the ignition coil 2 is interrupted, whereupon a high voltage whose polarity is opposite to that of the voltage that has been induced at the time instant t1 is induced and applied across the electrodes of the ignition plug 3. The high voltage induced across the secondary coil 22 is large enough to produce a spark discharge between the electrodes of the ignition plug 3; therefore, the ignition plug 3 produces a spark discharge in the combustion chamber of the internal combustion engine so as to ignite a supplied fuel.

When a spark discharge is produced at the ignition plug 3, a secondary current of the ignition coil 2 flows from the ignition plug 3 to the biasing device 4, whereby the capacitor 42 in the biasing device 4 is charged. At this time, the charging current becomes a steep current; however, because having a direction opposite to that of the foregoing charging current that flows at the time instant t1, this charging current is not extracted from the signal extraction device 6. When the charging voltage across the capacitor 42 exceeds the breakdown voltage of the zener diode 41, the secondary current of the ignition coil 2 flows into the ground by way of the zener diode 41 that has undergone a break down.

Next, when the spark discharge by the ignition plug 3 is completed, the voltage across the charged capacitor 42 in the biasing device 4 is applied across the electrodes of the ignition plug 3 through the secondary coil 22 of the ignition coil 2. The polarity of the voltage applied across the electrodes at this time is opposite to that of a voltage applied across the electrodes when a spark discharge is executed; at the time instant t3 when that voltage starts to be applied, a discharging current from the capacitor 42 instantaneously flows through the secondary coil 22 and the electrodes of the ignition plug 3.

A current signal 122 based on the discharging current is applied to the signal extraction device 6; during a duration in which the current signal 122 is above the comparison level 13 set for the differential amplifier 61 in the signal extraction device 6, the diagnosis signal 14 outputted from the signal extraction device 6 becomes a high level 141, as represented as (c) in the condition 1 in FIG. 2, and is inputted to the A/D conversion circuit 12 in the ECU 1 so as to be converted into a digital signal.

The first duration setting unit 111 provided in the microprocessor 10 in the ECU 1 sets a first detection duration 15 represented in FIG. 2. In order to avoid the effect of ignition noise, the first detection duration 15 set by the first detection setting unit 111 is set in such a way as to be a time period between the time instant t3, corresponding to a time instant by which a predetermined time or a predetermined angle duration set for each driving condition including the rotation speed of the internal combustion engine, the load on the internal combustion engine, and the like elapses from the ignition timing t2, and a time instant t4 when a predetermined time or a predetermined angle duration set for each driving condition including the rotation speed of the internal combustion engine, the load on the internal combustion engine, and the like ends. A spark discharge produced by the ignition plug 3 occurs in the first detection duration 15.

The second duration setting unit 112 provided in the microprocessor 10 in the ECU 1 sets a second detection duration 16 represented in FIG. 2. The second detection duration 16 set by the second detection setting unit 112 is set in such a way as to be a time period between the time instant t4 when the first detection duration 15 ends and a time instant t5, corresponding to a time instant by which a predetermined time or a predetermined angle duration set for each driving condition including the rotation speed of the internal combustion engine, the load on the internal combustion engine, and the like elapses from the time instant t4. In addition, the second detection duration 16 may be set in such a way as to start after the elapse of a predetermined time from the time instant t4 when the first detection duration 15 ends.

The foregoing "angle" denotes a crank angle of an internal combustion engine, and an "angle" hereinafter refers to a crank angle, unless otherwise noted in particular. Additionally, a position or a range is represented hereinafter by a time instant or a time; however, the apparatus can similarly be configured also in the case where a position or a range is replaced by an angle position or an angle range.

Next, the operation of the ignition diagnosis apparatus according to Embodiment 1 of the present invention will be explained. FIG. 3 is a flowchart for explaining the operation of the internal-combustion-engine ignition diagnosis apparatus according to Embodiment 1 of the present invention. In addition, the variable A in the flowchart represented in FIG. 3 indicates the result of a spark diagnosis; "0" indicates "indefinite", "1" indicates "normal ignition", "2" and "3" indicate "abnormal ignition" respectively.

In the first place, the ignition diagnosis operation in the case of the condition 1 in FIG. 2 will be explained. In FIG. 3, firstly in the step S31, the diagnosis unit 113 provided in the microprocessor 10 in ECU 1 ascertains whether or not the ignition signal 11 has fallen. Because, as represented in (a) in FIG. 2, the ignition signal 11 falls at the time instant t2, the step S31 is followed by the step S32 and the variable A indicating the result of an ignition diagnosis is cleared to "0".

Immediately after the time instant t2 represented in FIG. 2, the step S31 is followed by the step S33, and it is determined whether or not "A=0"; because, in the step S32, A has been cleared to "0" (Y), the step S33 is followed by the step S34. In the step S34, it is determined whether or not the present time instant falls within the first detection duration 15. When, at the time instant t3 represented in FIG. 2, the present time instant falls into the first detection duration 15, it is determined that the present time instant falls within the first detection duration 15 (Y); after that, the step S34 is followed by the step S35, and the number of rising edges of the diagnosis signal 14 in the first detection duration 15 is counted. In the condition 1 in FIG. 2, because the number of rising edges is "0", a variable N1 is set to "0"; after that, the step S35 is followed by the step S36, and it is determined whether or not "N1>0". In the step S36, it is determined that "N1=0" (N); therefore, the step S36 is followed by the step S37, and the diagnosis ends, while maintaining the state "A=0", i.e., the indefinite state.

Next, because, immediately after the time instant t4 represented in FIG. 2, the present time instant falls into the second detection duration 16, the result of a determination in the step S34 becomes "N", and the step S34 is followed by the step S38. In the step S38, it is determined that the present time instant falls within the second detection duration 16 (Y), and then the step S38 is followed by the step S39. In the step S39, the number of rising edges of the diagnosis signal 14 in the second detection duration 16 is counted. In the condition 1 in FIG. 2, the number of rising edges of the diagnosis signal 14 in the second detection duration 16 is "1"; therefore, a variable N2 is set to "1", and the step S39 is followed by the step S310. In the step S310, it is determined whether or not "N2>0"; because the determination leads to "N2=1" (Y), the step S310 is followed by the step S311, and a determination "A=1", i.e., "normal ignition" is made. As described above, in the case of the foregoing condition 1 in FIG. 2, the diagnosis unit 113 diagnoses that the ignition is normal.

Next, the ignition diagnosis operation in the case of the condition 2 in FIG. 2 will be explained. Because, as described above, the ignition signal 61 falls at the time instant t2 in FIG. 2, the step S31 is followed by the step S32, and the variable A is cleared to "0".

Immediately after the time instant t2 represented in FIG. 2, the step S31 is followed by the step S33, and it is determined whether or not "A=0"; however, because, in the step S32, A has been cleared to "0" (Y), the step S33 is followed by the step S34. In the step S34, it is determined whether or not the present time instant falls within the first detection duration 15. When, at the time instant t3 represented in FIG. 2, the present time instant falls into the first detection duration 15, it is determined that the present time instant falls within the first detection duration 15 (Y); after that, the step S34 is followed by the step S35, and the number of rising edges of the diagnosis signal 14 in the first detection duration 15 is counted.

Because, in the condition 2 in FIG. 2, the number of rising edges is "3", a variable N1 is set to "3", and the step S35 is followed by the step S36, where it is determined whether or not "N1>0". In the step S36, it is determined that "N1=3" (Y); therefore, the step S36 is followed by the step S312, and the diagnosis ends, while diagnosing that the state of the ignition is "A=2", i.e., "abnormal ignition". As described above, in the case of the condition 2 in FIG. 2, the diagnosis unit 113 diagnoses in the first detection duration 15 that the ignition is abnormal.

Next, the ignition diagnosis operation in the case of the condition 3 in FIG. 2 will be explained. In this case, during the time period prior to the time instant t4, in FIG. 2, at which the second detection duration 16 starts, i.e., in the diagnosis from the step S31 to the step S38, the diagnosis operation is the same as that in the case of the condition 1 described above.

The number of rising edges of the diagnosis signal 14 in the second detection duration 16 is "0"; thus, the variable N2 becomes 0 in the step S39, and the step S39 is followed by the step S310, where it is determined whether or not "N2>0". As a result of the determination in the step S310, a determination "N" is made; therefore, the step S310 is followed by the step S313, where a result "A=3", i.e., "abnormal ignition" is obtained. In the case of the foregoing condition 2 in FIG. 2, a diagnosis "abnormal ignition" is made because A=2; however, in the case of the condition 3, a diagnosis "abnormal ignition" is made because A=3; thus, the conditions 2 and 3 can be distinguished from each other.

Furthermore, the ignition diagnosis operation in the case of the condition 4 in FIG. 2 will be explained. In this case, the diagnosis according to the flowchart in FIG. 3 leads to a result "abnormal ignition" because A=3, as is the case with the condition 3. However, the condition 4, in which a normal spark discharge is executed, is not a condition of abnormal ignition; therefore, it is required to distinguish the diagnosis result in the case of the conditions 4 from that in the case of the condition 3. Thus, in order to distinguish them from each other, a wire-breakage diagnosis is concurrently performed.

FIG. 4 is a flowchart for explaining wire-breakage diagnosis operation of the diagnosis unit 113. In FIG. 4, it is determined in the step S41 whether or not the present time instant falls within the first detection duration 15. Because, immediately after the time instant t3 represented in FIG. 2, the present time instant falls into the first detection duration 15, a determination "Y" is made in the step S41, and the step S41 is followed by the step S42.

In the step S42, integration processing is applied to the diagnosis signal 14 which is the result of the comparison, in the first detection duration 15, between the current signal 12 and the comparison level 13, and the integration result is stored as a variable C. The condition 4 represented in FIG. 2 is a case in which, although a normal spark discharge between the electrodes of the ignition plug 3 is produced and a normal combustion is performed, the diagnosis signal 14 is not normally transmitted from the signal extraction device 6 to the ECU 1, due to breakage of the path through which a diagnosis result is transmitted; therefore, the diagnosis signal 14 is always high-level. After the integration processing in the step S42 is completed, the step 42 is followed by the step S43, where a variable F is set to "0" in order to indicate that the integration processing is being performed.

Because, immediately after the time instant t4 represented in FIG. 2, the present time instant falls outside the first detection duration 15, a determination "N" is made in the step S41, and the step S41 is followed by the step S44. In the step S44, it is determined whether or not "F=0"; because F=0 (Y), the step S44 is followed by the step S45. In the step S45, the variable C, which is a value obtained by integrating the diagnosis signal 14 which is the result of the comparison in the first detection duration 15, and a predetermined threshold value are compared. In the case where the variable C exceeds the threshold value (Y), it is determined that the path through which a diagnosis result is transmitted is broken; then, the step S45 is followed by the step S47, where the variable F is set to "2" in order to indicate that the path is broken. It is appropriate that the matching value of the threshold value is set to approximately half of the maximal integration value, of the diagnosis signal 14, which can occur in the first detection duration 15.

It is premature to immediately determine that the path is broken, just in the case where a condition in which F becomes "2" in the step S47 singly occurs, and to urge a vehicle driver to repair the path; therefore, it is better to determine that the path is broken, in the case where the condition continuously occurs a predetermined number times or in the case where the condition occurs a predetermined number times or more per unit time, and to make a sign, such as lightning a lamp, to be generated so as to urge a driver to repair the breakage of the path.

The diagnosis signal 14 in the case of the condition 4 in FIG. 2 is always high-level; because the variable C is the maximal integration value among integration values which can occur in the first detection duration 15 and the threshold value to be compared with the variable C is set to half of the maximal integration value, a determination "Y" is made in the step S45, and then the step S45 is followed by the step S47. Because F=2 in the step S47, a diagnosis result "broken" can be obtained.

In contrast to the wire-breakage diagnosis operation in the condition 4 represented in FIG. 2, the wire-breakage diagnosis operation in the condition 3 is as follows: That is to say, in FIG. 4, the diagnosis signal 14 in the first detection duration 15 is low-level, and the integration value of the diagnosis signal 14 which is a comparison result in the step S42 is "0"; therefore, the variable C as an integration value thereof becomes "0". Because the threshold value to be compared with the variable C in the step S45 is set to half of the maximal integration value, the result of the determination in the step S45 is "N"; thus, the step S45 is followed by the step S46. In the step S46, a result "F=1" that indicates that the path is not broken but is normal can be obtained. In other words, the diagnosis result in the case of the condition 3 can be distinguished from the foregoing diagnosis result in the case of the condition 4.

In the wire-breakage diagnosis operation in the case of the condition 1 in FIG. 2, although the diagnosis signal 14 becomes high-level three times in the first detection duration 15, the variable C as an integration value of the diagnosis signal 14 is smaller than the threshold value that is set to half of the maximal integration value; therefore, in the step S45, the determination result becomes "N", and the step S45 is followed by the step S46, where a result "F=1" that indicates that the path is not broken but is normal can be obtained.

Additionally, in the wire-breakage diagnosis operation in the case of the condition 2 in FIG. 2, the diagnosis signal 14 is low-level in the first detection duration 15. Therefore, as is the case with the wire-breakage diagnosis operation in the case of the condition 3, a result "F=1" that indicates that the path is not broken but is normal can be obtained in the step S46.

In addition, in the wire-breakage diagnosis operation represented in FIG. 4, an integration value of the diagnosis signal which is a comparison result in the first detection duration 15 is obtained; however, the same result can be obtained by utilizing the result of integration of the ignition signal 11 from the time instant t2 when the ignition signal 11 falls to the time instant t4.

Additionally, in the wire-breakage diagnosis operation represented in FIG. 4, the integration value of the result of a comparison in the first detection duration 15 is obtained; however, an arbitrary-duration integration result in a process or a duration in which no ion due to a combustion flame exists in the cylinder maybe utilized. However, due to a leakage current caused by carbon or the like that adheres to the ignition plug 3, a duration setting of this kind may cause a case in which no correct determination can be performed; therefore, it is required to take it into account that no wire-breakage diagnosis represented in FIG. 4 is performed when a leakage current occurs.

In addition, in the foregoing description, the diagnosis signal 14 is made high-level in the case where the current signal 12 exceeds the comparison level 13 and is made low-level in other cases; however, the relationship between the high level and the low level may be reversed.

However, in the case where the relationship is reversed, i.e., in the case where the diagnosis signal 14 as a comparison result is made low-level when the current signal 12 exceeds the comparison level 13 and is made high-level in other cases, no wire-breakage determination in accordance with the flowchart in FIG. 4 can be performed; even in this case, however, the same effect can be obtained in such a way that a pulse dedicated to the wire-breakage diagnosis is superimposed on the signal or the low level of the signal is rendered slightly above the zero, and unless the low level is above the zero, a determination "wire breakage" is made.

As described above, in the internal-combustion-engine ignition diagnosis apparatus according to Embodiment 1 of the present invention, because a failure diagnosis on an ignition system can securely be performed, a failure in the system can appropriately be recognized; therefore, even in the case where, due to a failure, the gasoline mileage decreases or the emission performance is deteriorated, a driver is urged to repair the defective portion so that a rapid repair can be performed; thus, the internal-combustion-engine ignition diagnosis apparatus can contribute to environmental conservation.

Embodiment 2

Internal combustion engines in each of which a plurality of ignition devices is arranged in a single combustion chamber, i.e., in the same combustion chamber have been put to practical use. There exist a number of reasons why a plurality of ignition devices is provided in the same combustion chamber; firstly, in order to raise the combustion efficiency so as to enhance the thermal efficiency of the internal combustion engine; secondly, in order to apply an auxiliary measures to a case in which the combustibility is low.

In any of the foregoing cases, a plurality of ignition devices is utilized by necessity. Accordingly, when part of the plurality of ignition devices provided in the same combustion chamber fail, an expected effect of the internal combustion engine, such as an expected output, cannot be obtained; therefore, deterioration in the gasoline mileage and deterioration in the emission due to the spread of a noncombustible region are feared.

However, the failure of part of the plurality of ignition devices, for example, the failure of one ignition device does not immediately lead to the cessation of combustion, but just leads to a slight deterioration in the combustibility or the deterioration in the emission; therefore, in many cases, it is difficult for a driver to recognize a state of this kind.

Accordingly, in the case where an internal combustion engine of this kind in which a plurality of ignition devices is provided in a single combustion chamber includes an ignition diagnosis apparatus that performs an ignition diagnosis on each of the plurality of ignition devices, a failure in the system can appropriately be recognized and appropriate measures therefore can be taken, even in the foregoing case in which part of the ignition devices fail; thus, the ignition diagnosis apparatus described above can contribute to environmental conservation.

An internal-combustion-engine control apparatus, described later, according to Embodiment 2 of the present invention will be explained under the assumption that, as a typical example, two ignition devices are provided in a single combustion chamber, i.e., in the same combustion chamber. Additionally, the explanation will be made under the assumption that an ignition coil is utilized in the high voltage device.

Figure 5:
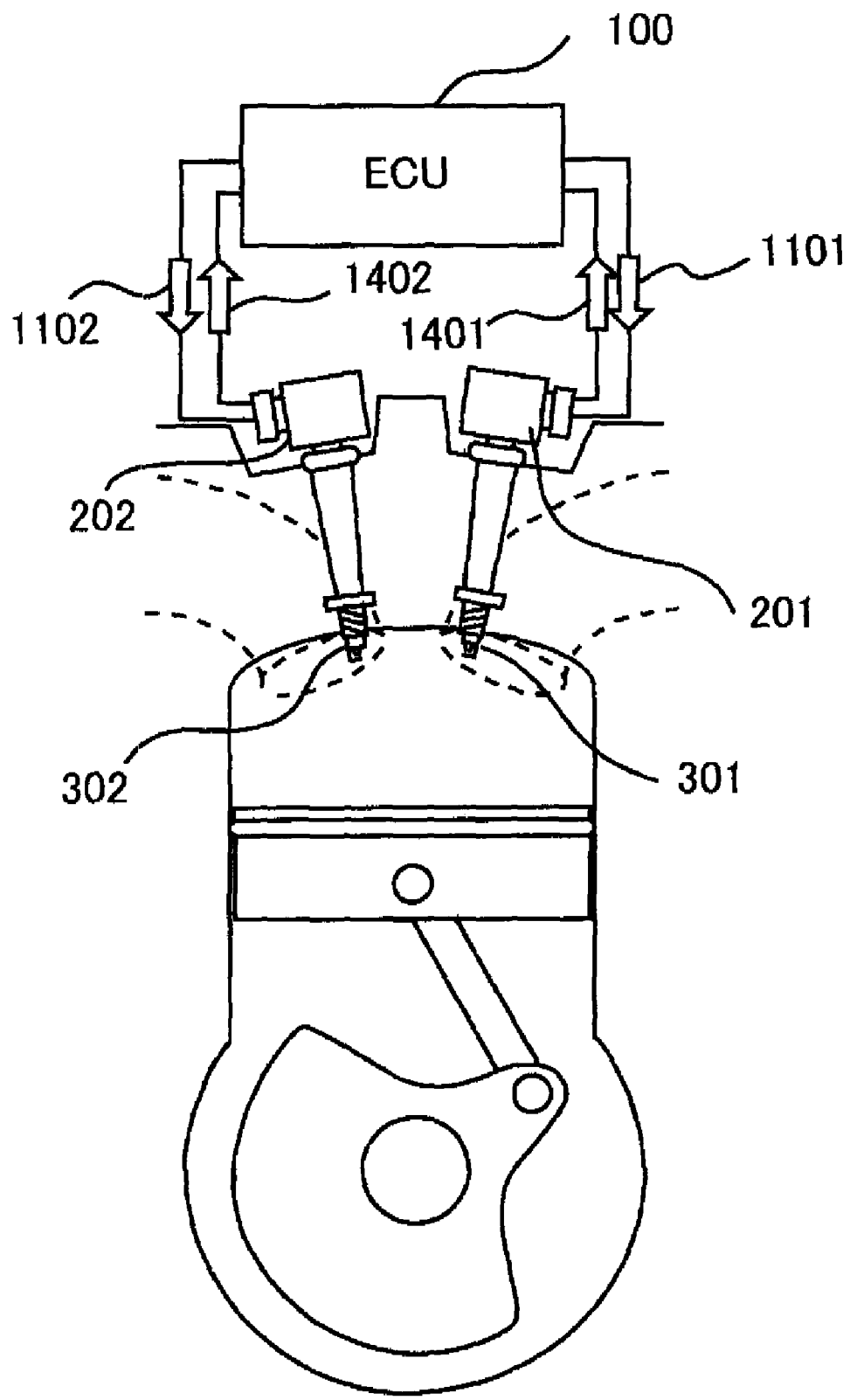
FIG. 5 is a configuration diagram illustrating the configuration of an internal-combustion-engine control apparatus according to Embodiment 2 of the present invention.

FIG. 5 is a configuration diagram illustrating an internal-combustion-engine control apparatus provided with an ignition diagnosis apparatus according to Embodiment 2 of the present invention. In FIG. 5, an ECU 100 transmits to ignition coils 201 and 202 ignition signals 1101 and 1102, respectively, which are similar to the ignition signal 11 represented in FIG. 2(*a*), for driving the ignition coils 201 and 202 as high voltage devices. As is the case with Embodiment 1, described above, illustrated in FIG. 1, the ignition coils 201 and 202 each generate a negative high voltage based on the ignition signals 1101 and 1102, respectively; respective spark discharges are generated between the electrodes of an ignition plug 301 as an ignition device and between the electrodes of an ignition plug 302 as an ignition device; a fuel supplied to the combustion chamber catches fire, thereby producing combustion in the combustion chamber; in this manner, the operation of the internal combustion engine is performed. The ECU 100 serves also as a control unit for controlling the spark-discharge operation of the ignition plugs 301 and 302.

In this situation, in the internal-combustion-engine control apparatus configured as described above, an ignition diagnosis apparatus configured in the same manner as in Embodiment 1 illustrated in FIG. 1 is provided in each of an ignition system including the ignition coil 201 as a high voltage device and the ignition plug 301 and an ignition system including the ignition coil 202 as a high voltage device and the ignition plug 302.

That is to say, as explained in Embodiment 1 described above, each of the ignition diagnosis apparatuses in the ignition systems is provided with the biasing device 4 that applies a positive voltage across the electrodes of the ignition plug 301 (302), a signal extraction device 6 that compares a current signal obtained through the application of the positive voltage with a comparison value and outputs a diagnosis signal as the result of the comparison, and the diagnosis unit 113 that performs a spark discharge diagnosis by use of the diagnosis signal from the signal extraction device 6. The diagnosis unit 113 is provided in the microprocessor 10 in the ECU 100. In addition, the microprocessor 10 is provided with the first duration setting unit 111 and the second duration setting unit 112. The configuration and operation of the ignition diagnosis apparatus constituted in this manner are the same as those of the ignition diagnosis apparatus according to Embodiment 1.

In Embodiment 2, the biasing device 4 and the signal extraction device 6 included in the ignition diagnosis apparatus are disposed inside each of the ignition coils 201 and 202, and the diagnosis unit 113, the first duration setting unit 111, and the second duration setting unit 112 included in the microprocessor 10 are arranged in the ECU 100, as described above.

In other words, diagnosis signals 1401 and 1402 similar to the diagnosis signal 14 represented in FIG. 2 are transmitted to the ECU 100, and the diagnosis processing represented in the flowcharts in FIGS. 3 and 4 is performed in the ECU 100.

After the diagnosis, in the case where it is determined that an abnormal spark discharge has occurred, the ECU 100 performs fail-safe control in accordance with a flowchart represented in FIG. 6 to control the internal combustion engine so that measures for preventing deterioration in the emission is taken. FIG. 6 is a flowchart for explaining the operation of the internal-combustion-engine control apparatus according to Embodiment 2.

That is to say, in FIG. 6, in the first place, it is determined in the step S61 whether or not a failure has been caused in a single ignition system. In Embodiment 2, two ignition systems including two ignition coils 201 and 202 and two ignition plugs 301 and 302 are provided in the same combustion chamber; in the case where either one of the ignition systems fails (Y), the step S61 is followed by the step S62.

In the step S62, it is determined whether or not the driving condition required by a driver is within a region where driving can be performed with a single ignition system. For example, in the case where the thermal efficiency of an internal combustion engine is required to be raised, the effect of two-point ignition is small when the engine rotates at high speed; therefore, in the case of a driving condition of this kind, it is determined that driving can be performed with a single-ignition-coil ignition system, and the step S62 is followed by the step S64.

In the step S64, although the driving condition is within a region where driving can be performed with a single-ignition-coil ignition system, there exists an ignition system in failure; thus, the driver is notified of the apparatus in failure. The unit for notifying the driver of the apparatus in failure may be either lightning or blinking of a lamp, or measures, e.g., sounding a buzzer may be taken.

In the case where, in the step S62, it is determined that the driving cannot be performed with a single-ignition-coil ignition system (N), the step S62 is followed by the step S63, where the ECU 100 performs fail-safe control so as to make the driving condition fall within a region where driving can be performed with a single-ignition-coil ignition system. For example, in the case where, in a high-load region where the engine rotates at low speed, two-point ignition is required, but in a low-load region, two-point ignition is not required, limitations are placed on the load, and the engine is controlled in such a way that the load becomes the same as or less than a predetermined amount at a predetermined rotation region.

Additionally, in the case where, in a certain rotation region, two-point ignition is required in every load region, the fuel injection amount and the throttle opening degree are controlled in such a way that the driving condition falls within a rotation region and a load region where driving can be performed with single-point ignition. Basically, it is desirable to control the engine in such a way that both the rotation speed and the load are reduced; however, as may be necessary, the engine is controlled in such a way that both the rotation speed and the load increase. After, as described above, performing the control so as to place limitations on the driving region, the step S63 is followed by the step S64, where the driver is notified of the abnormality, as described above.

In the case where a plurality of ignition systems provided in a single cylinder, i.e., in the same combustion chamber is in failure, in other words, in the case where, in the case of Embodiment 2, all the two ignition systems are in failure, the step S61 is followed by the step S65, where it is determined whether or not a plurality of ignition systems is abnormal; in the case where it is determined that a plurality of ignition systems is abnormal (Y), the step S65 is followed by the step S66. In the step S66, supply of a fuel to and ignition of the subject cylinders are stopped, and then the step S66 is followed by the step S64, where the driver is notified of the failure. In this situation, the same effect can be obtained in the step S66, without stopping the ignition.

A case has been described above in which one ignition system is in failure and there exists a region where driving can be performed with the residual ignition system, e.g., with single-point ignition; however, this region may largely change its nature, depending on the arrangement of the ignition systems.

For example, in the case where, in a system in which two-point ignition is performed in the same cylinder, the ignition system consists of main-ignition and sub-ignition parts, the region where driving can be performed with single-point ignition changes largely depending on which one of the main-ignition and the sub-ignition part fails. In such a case as this, the determination, e.g., whether to select a region where driving can be performed, in accordance with an ignition system in failure or to stop supply of a fuel to the subject cylinder may flexibly be made.

Additionally, in the foregoing description, an explanation has been made in which, in the case where only one ignition system is in failure, the step S62 is followed by the step S63, where limitations are placed on a driving region; however, the processing in the step S66 may directly be implemented without any condition when at least one ignition system fails.

As described above, in the internal-combustion-engine control apparatus according to Embodiment 2 of the present invention, because, in a multi-point ignition system, a diagnosis on each ignition system can be performed, a failure in the system can appropriately be recognized, even in the case where part of the ignition systems fail; therefore, even in the case where, due to a failure, the gasoline mileage decreases or the emission performance is deteriorated, a driver is urged to repair the part in failure so that a rapid repair can be performed; therefore, the internal-combustion-engine control apparatus can contribute to environmental conservation.

Variant Examples of Embodiment 2

In addition, in the foregoing description, a case has been explained in which a biasing device included in an ignition diagnosis apparatus and a signal extraction device, which serves also as a comparison device, are arranged inside an ignition coil, and the ignition diagnosis apparatus is disposed inside an ECU; however, the configuration may be made in such a way that only the biasing device is disposed inside the ignition coil, and the signal extraction device and the ignition diagnosis apparatus are arranged inside the ECU.

Furthermore, the signal extraction device may be included, as either hardware or software, in the ECU.

By arranging a critical mass of devices in an ignition coil, the foregoing configuration can contribute to downsizing and weight saving of the ignition coil, and by forming the signal extraction device with software in an ECU, the number of components can also be reduced; therefore, the formation with software can contribute to downsizing, weight saving, and cost reduction of the ECU.

All of the biasing device, the signal extraction device, and the ignition diagnosis apparatus may be arranged inside the ignition coil.

Moreover, formation of the signal extraction device and the ignition diagnosis apparatus with a single-package ASIC can contribute to downsizing of the ignition coil.

The foregoing configuration can contribute to raising the added value of the ignition coil and can reduce the number of components inside the ECU, thereby contributing to downsizing and weight saving of the ECU and reducing the load to be dealt with by the ECU.

According to the foregoing variant example of Embodiment 2, because, in a multi-point ignition system, a diagnosis on each ignition system can be performed, a failure in the system can appropriately be recognized, even in the case where part of the ignition systems fail, and optimization of the configurations of the ignition coil and the ECU can contribute to downsizing, weight saving, and cost reduction thereof.

Embodiment 3

In the case where a high load is imposed on the engine when the engine rotates at high speed, a discharge time becomes short; therefore, setting of the first detection duration and the second detection duration by the ignition diagnosis apparatus, described in Embodiments 1 and 2, becomes difficult. Accordingly, in an ignition diagnosis apparatus according to Embodiment 3, no ignition diagnosis is performed under the foregoing driving condition.

According to Embodiment 3, an erroneous diagnosis on ignition can be prevented; therefore, a failure diagnosis on an ignition system can appropriately be performed, whereby a failure in the system can be recognized.

INDUSTRIAL APPLICABILITY

An ignition diagnosis apparatus according to the present invention is an apparatus that is mounted in a vehicle, a two-wheeled vehicle, an outboard engine, a special machine, or the like and appropriately detects an abnormality in ignition operation for driving an internal combustion engine; the ignition diagnosis apparatus prevents deterioration in the gasoline mileage and in the emission due to abnormal ignition operation, and contributes to the solution of the problem of fuel depletion and to environmental conservation.

Various modifications and alterations of this invention will be apparent to those skilled in the art without departing from the scope and spirit of this invention, and it should be understood that this is not limited to the illustrative embodiments set forth herein.

What is claimed is:

1. An internal-combustion-engine ignition diagnosis apparatus that is provided in an internal combustion engine having an ignition device that performs operation of generating a spark discharge for igniting a fuel supplied into a combustion chamber of the internal combustion engine and a high voltage device that generates a high voltage for generating the spark discharge and applies the high voltage to the ignition device, and that diagnoses a condition of the spark discharge generated by the ignition device, the internal-combustion-engine ignition diagnosis apparatus comprising:

a biasing device that generates a biasing voltage whose polarity is opposite to that of the high voltage and applies the biasing voltage to the ignition device;
a signal extraction device that extracts a signal generated due to application of the biasing voltage;
a first duration setting unit that sets a first detection duration in which the extracted signal is processed;
a second duration setting unit that sets a second detection duration in which the extracted signal is processed; and
a diagnosis unit that diagnoses a condition of the spark discharge, based on the signal in the first detection duration and the second detection duration,
wherein the first duration setting unit sets the first detection duration in a predetermined duration including a time instant when the spark discharge is generated,
wherein the second duration setting unit sets the second detection duration after the first detection duration, and
wherein the diagnosis unit determines normality of the spark discharge, based on a signal state in the second detection duration, and regardless of the signal state in the second detection duration, determines abnormality of the spark discharge, based on a signal state in the first detection duration.

2. An internal-combustion-engine control apparatus comprising:

a plurality of ignition devices that are provided in a same combustion chamber and each perform operation of generating a spark discharge for igniting a fuel supplied into the combustion chamber;
a plurality of high voltage devices that generate high voltages for making the plurality of ignition devices generate spark discharges and apply the high voltages to the plurality of ignition devices;
a plurality of biasing devices that generate biasing voltages whose polarities are opposite to those of the high voltages and apply the biasing voltages to the plurality of ignition devices;
a control unit that controls the operations of the plurality of ignition devices; and
an ignition diagnosis apparatus that diagnoses states of the spark discharges generated by all of the plurality of ignition devices, the ignition diagnosis apparatus comprising:
a signal extraction device that extracts a signal generated due to application of the biasing voltage;
a first duration setting unit that sets a first detection duration in which the extracted signal is processed;
a second duration setting unit that sets a second detection duration in which the extracted signal is processed; and
a diagnosis unit that diagnoses a condition of the spark discharge, based on the signal in the first detection duration and the second detection duration,
wherein the first duration setting unit sets the first detection duration in a predetermined duration including a time instant when the spark discharge is generated,
wherein the second duration setting unit sets the second detection duration after the first detection duration, and
wherein the diagnosis unit determines normality of the spark discharge, based on a signal state in the second detection duration, and regardless of the signal state in the second detection duration, determines abnormality of the spark discharge, based on a signal state in the first detection duration.

3. The internal-combustion-engine control apparatus according to claim 2, wherein, in the case where the internal combustion engine is in a predetermined driving condition, the diagnosis by the ignition diagnosis apparatus is prohibited.

4. The internal-combustion-engine control apparatus according to claim 2, wherein, in the case where the ignition diagnosis apparatus determines that abnormality exists in states of spark discharges generated by part of the plurality of ignition devices provided in the same combustion chamber, the control unit controls the internal combustion engine in such a way that the abnormality does not cause the internal combustion engine to be driven in a driving condition in which combustibility is below a predetermined level.

5. The internal-combustion-engine control apparatus according to claim 2, wherein, in the case where the ignition diagnosis apparatus determines that abnormality exists in states of spark discharges generated by part of the plurality of ignition devices provided in the same combustion chamber, the control unit operates in such a way as to stop fuel supply to the combustion chamber.

6. The internal-combustion-engine control apparatus according to claim 2, wherein the ignition diagnosis apparatus is disposed in a same package as the ignition device.

7. The internal-combustion-engine control apparatus according to claim 2, wherein the ignition diagnosis apparatus is disposed in a same package as the control unit.

* * * * *